United States Patent
Yoshida

(10) Patent No.: US 7,853,138 B2
(45) Date of Patent: Dec. 14, 2010

(54) CAMERA AND PHOTOGRAPHIC LENS AND DIAPHRAGM FOR STARTING A DEFOCUS DETECTION WITHOUT WAITING FOR COMPLETION OF AN APERTURE OPENING OPERATION

(75) Inventor: Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 414 days.

(21) Appl. No.: 12/028,231

(22) Filed: Feb. 8, 2008

(65) Prior Publication Data

US 2008/0199174 A1      Aug. 21, 2008

(30) Foreign Application Priority Data

Feb. 19, 2007    (JP)    ............... 2007-038486

(51) Int. Cl.
*G03B 13/22*    (2006.01)
*G03B 13/20*    (2006.01)

(52) U.S. Cl. ............... 396/91; 396/92; 396/509; 348/350

(58) Field of Classification Search ............ None
See application file for complete search history.

(56) References Cited

U.S. PATENT DOCUMENTS 5,517,273 A * 5/1996 Tsukada ............... 396/91
6,037,980 A * 3/2000 Takeda ............... 348/354

FOREIGN PATENT DOCUMENTS

JP       10-260449 A    9/1998

* cited by examiner

*Primary Examiner*—W. B. Perkey
*Assistant Examiner*—Bret Adams
(74) *Attorney, Agent, or Firm*—Canon U.S.A., Inc. I.P. Division

(57) ABSTRACT

A camera is provided which is adapted to receive a photographic lens having a diaphragm. The camera includes a detection unit configured to execute electric charge accumulation for detecting a defocus amount when the diaphragm is in a state having a first aperture value, and a controller configured to, when causing the diaphragm to perform an aperture reducing operation from the first aperture value to a second aperture value, cause the diaphragm to start the aperture reducing operation without waiting for completion of the electric charge accumulation for detecting the defocus amount by the detection unit.

5 Claims, 5 Drawing Sheets

CAMERA AND PHOTOGRAPHIC LENS AND DIAPHRAGM FOR STARTING A DEFOCUS DETECTION WITHOUT WAITING FOR COMPLETION OF AN APERTURE OPENING OPERATION

BACKGROUND OF THE INVENTION

1. Field of the Invention

The present invention relates to a camera configured to detect a defocus amount, a photographic lens mountable on the camera, and a camera system.

2. Description of the Related Art

Conventionally, in a camera system, such as an interchangeable lens type single-lens reflex camera, an automatic exposure (hereinafter referred to as AE) device has widely been known. The AE device photo-electrically converts an object image from a photographic lens to determine an exposure amount (exposure value).

Further, a technique of automatic focus adjustment (hereinafter also referred to as AF) has been known. The AF technique forms images of fluxes of light from an object passing through different exit pupil areas of a photographic lens on a pair of line sensors to determine the amount of deviation of the images. The amount of deviation of the images is a relative position displacement amount of a pair of image signals obtained by photo-electrically converting an object image. Then, the AF technique detects a defocus amount of the photographic lens with respect to the object based on the amount of deviation of images. Then, the AF technique drives the photographic lens based on the detected defocus amount. Further, the AF technique can include a servo mode that causes lens driving to track not only a still object but also a moving object, and can allow continuous shooting.

In a single-lens reflex camera, a factor that determines a speed of the continuous shooting includes a time period required for AE and AF and a time period required for a series of photographing operations (hereinafter referred to as a release sequence) from retraction of a mirror and driving of shutter to return of the mirror on the camera (main body) side. On the interchangeable lens side, the factor includes a time period required for a diaphragm driving sequence from reducing an aperture of a diaphragm to provide a predetermined exposure to opening the diaphragm up to a full-aperture position after completion of exposure.

Further, in a camera system, such as a single-lens reflex camera, a technique in which a camera obtains a time period required for driving a diaphragm of an interchangeable photographic lens is discussed in Japanese Patent Application Laid-Open No. 10-260449. According to Japanese Patent Application Laid-Open No. 10-260449, the technique is effective at enabling quick control of a camera system since a lens, which can communicate with a camera during driving of a diaphragm of the lens, can transmit a time period required for driving the diaphragm to the camera. However, Japanese Patent Application Laid-Open No. 10-260449 does not discuss more specific examples.

In order to enhance a continuous shooting performance, the camera system generally executes the release sequence on the camera side and the diaphragm driving sequence on the interchangeable photographic lens side in parallel. However, a conventional camera system causes a standby time on the camera side when an aperture reducing time on the photographic lens side is longer than a release sequence time on the camera side. This is remarkable during continuous shooting. This may reduce a speed of continuous shooting.

SUMMARY OF THE INVENTION

The present invention is directed to a camera and a photographic lens with a technique of allowing execution of higher-speed continuous shooting.

According to an aspect of the present invention, a camera is provided which is adapted to receive a photographic lens having a diaphragm. The camera includes a detection unit configured to execute electric charge accumulation for detecting a defocus amount when the diaphragm is in a state having a first aperture value, and a controller configured to, when causing the diaphragm to perform an aperture reducing operation from the first aperture value to a second aperture value, cause the diaphragm to start the aperture reducing operation without waiting for completion of the electric charge accumulation for detecting the defocus amount by the detection unit.

According to another aspect of the present invention, a camera is provided which is adapted to receive a photographic lens having a diaphragm. The camera includes a detection unit configured to execute electric charge accumulation for detecting a defocus amount when the diaphragm is in a state having a first aperture value, and a controller configured to, when causing the diaphragm to perform an aperture opening operation from a second aperture value to the first aperture value, cause the detection unit to start the electric charge accumulation without waiting for completion of the aperture opening operation.

According to yet another aspect of the present invention, a photographic lens includes a diaphragm unit configured to adjust an amount of light of an object light flux to be directed to an image pickup unit of a camera on which the photographic lens is mounted, and a diaphragm driving time prediction unit configured to output, to the camera, information on a predicted time period for which the diaphragm unit does not block the object light flux after the diaphragm unit starts an aperture reducing operation from a first aperture value to a second aperture value.

According to an exemplary embodiment of the present invention, a technique is provided which allows execution of higher-speed continuous shooting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
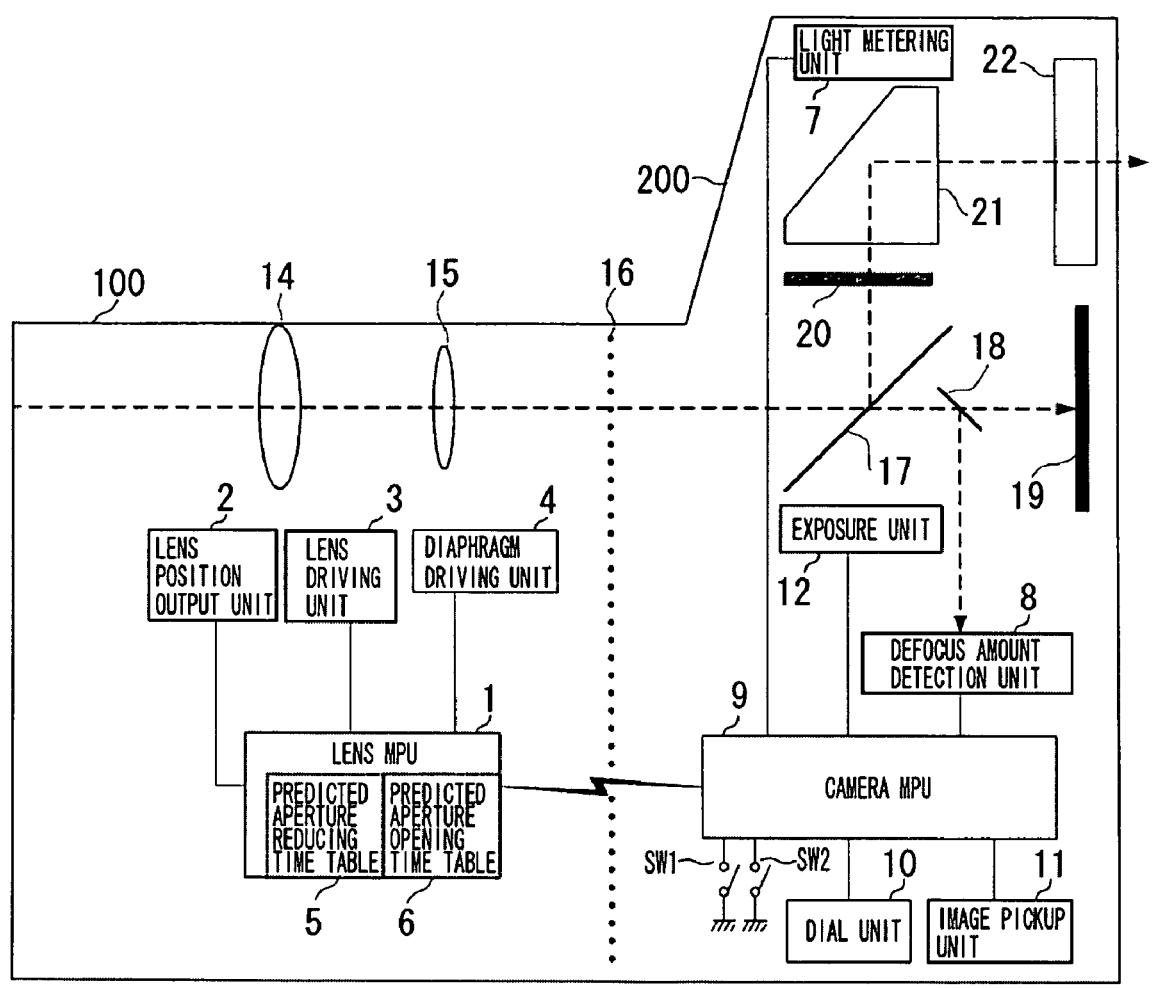
FIG. 1 is a diagram illustrating an exemplary configuration of a single-lens reflex camera system according to an exemplary embodiment of the present invention.

FIG. 1 is a diagram illustrating an exemplary configuration of an interchangeable lens type single-lens reflex camera system, which includes a photographic lens 100 and a camera 200, according to an exemplary embodiment of the present invention. In FIG. 1, the photographic lens 100 includes a lens micro processing unit (MPU) 1 and a lens position output unit 2 configured to detect an image forming position of a lens 14. The photographic lens 100 further includes a lens driving unit 3 configured to drive the lens 14 and a diaphragm driving unit 4 configured to drive a diaphragm 15.

The lens position output unit 2 outputs, to the camera 200, a relative position of the lens 14 as a pulse signal for the lens driving unit 3. The lens 14 includes an image forming function. Accordingly, the lens position output unit 2 measures information corresponding to an image forming position of the photographic lens 100 and outputs the information to the camera 200. More specifically, an encoder of the lens position output unit 2 outputs an optical change in a movable lens unit as a change in electric potential. The lens MPU 1 counts the change in electric potential to measure the information.

The lens MPU 1 includes tables 5 and 6. The table 5 stores a predicted diaphragm driving time (predicted aperture reducing time) required when the diaphragm 15 executes an aperture reducing operation. In the context of the present specification, the term "aperture reducing operation" refers to an operation for reducing an aperture value of the diaphragm 15 from a first aperture value that corresponds to a full-aperture position to a second aperture value that corresponds to an aperture value set by a user or a camera MPU 9. In the table 5, the lens MPU 1 searches for a predicted aperture reducing time based on an aperture value that is set by the user or the camera MPU 9. The table 6 stores a predicted diaphragm driving time (predicted aperture opening time) required when the diaphragm 15 executes an aperture opening operation from a reduced-aperture position to the full-aperture position. In the table 6, the lens MPU 1 searches for a predicted aperture opening time based on the set aperture value.

Additionally, the predicted aperture reducing time includes entrance time and actual aperture reducing time, which are separately stored in the table 5. The predicted aperture opening time includes actual aperture opening time and retraction time, which are separately stored in the table 6. The lens MPU 1 can communicate with the camera MPU 9 via a mount 16. Thus, the lens MPU 1 can transmit information on time stored in the tables 5 and 6 to the camera MPU 9. More specifically, the diaphragm 15 of the photographic lens 100 is designed with the stopping accuracy of movable blades of the diaphragm 15 and the fluctuation of the blades when the aperture of the diaphragm 15 is fully opened. Accordingly, when the diaphragm 15 reduces the aperture from the full-aperture position, the diaphragm 15 includes an area in which object light is not blocked by the blades of the diaphragm 15 (area in which at least a part of an object light flux is not blocked by the diaphragm 15). This area is referred to as a retraction area.

Figure 2A:
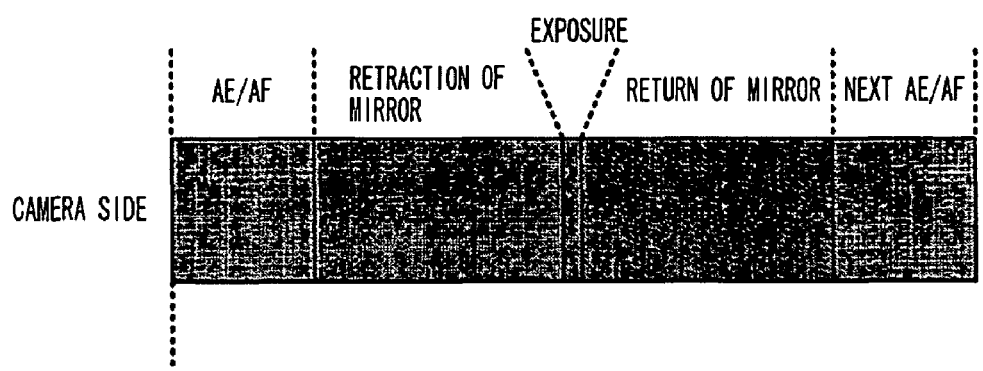
FIGS. 2A and 2B are diagrams illustrating an example release sequence on a camera side and an example diaphragm driving sequence on a photographic lens side, respectively, during continuous shooting according to an exemplary embodiment of the present invention.
Figure 2B:
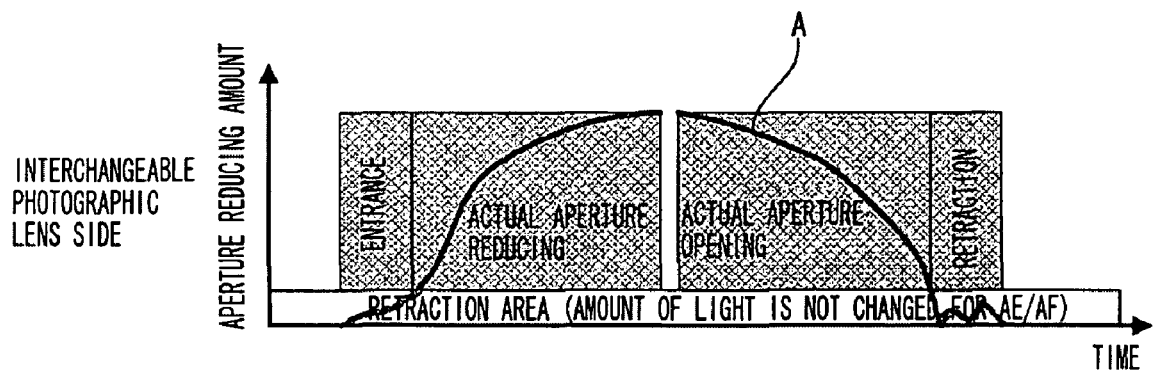

FIG. 2A is a timing chart illustrating a release sequence on the camera side. FIG. 2B is a timing chart illustrating a diaphragm driving sequence on the photographic lens 100 side. In FIG. 2B, a solid line A indicates opening and closing driving of the blades of the diaphragm 15.

Thus, during the aperture reducing operation of the diaphragm 15 and the aperture opening operation of the diaphragm 15, when the diaphragm blades (solid line A in FIG. 2) exist in the retraction area, the amount of light to be directed to an image pickup plane and a finder 22 does not change. That is, at the time of entrance and retraction of the diaphragm blades to be executed in the retraction area, AF and AE can be executed. In other words, in a predicted diaphragm driving time from a full-aperture position or a reduced-aperture position of the diaphragm 15 for which the amount of light for shooting is not influenced by the diaphragm 15, AF and AE can be executed. This is because the predicted diaphragm driving time is a predicted time period for which the diaphragm 15 does not block an object light flux after starting the aperture reducing operation or the diaphragm 15 does not block an object light flux after starting the aperture opening operation.

Figure 5A:
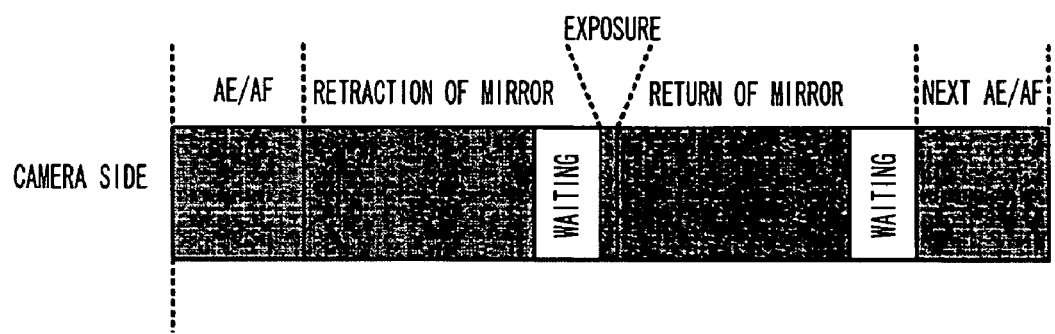
FIGS. 5A and 5B are diagrams illustrating an example release sequence on a camera side and an example diaphragm driving sequence on a photographic lens side, respectively, during continuous shooting according to a conventional single-lens reflex camera.
Figure 5B:
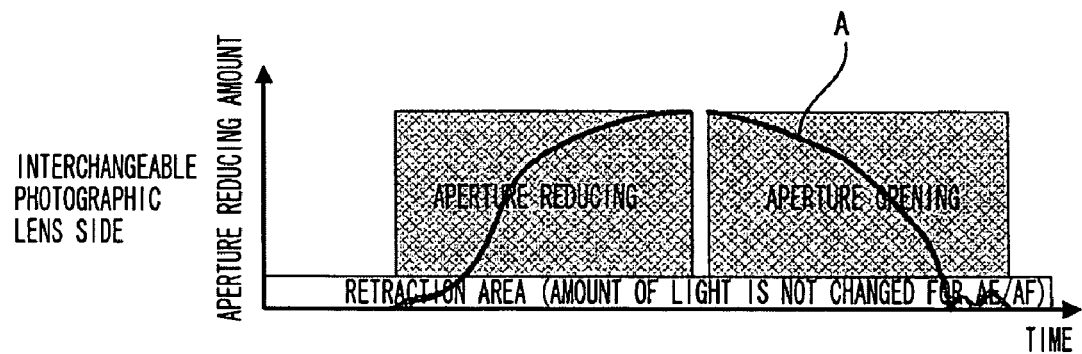

FIGS. 5A and 5B are diagrams to be compared with FIGS. 2A and 2B. FIG. 5A, which corresponds to FIG. 2A, is a timing chart illustrating a release sequence on the camera 200 side. FIG. 5B, which corresponds to FIG. 2B, is a timing chart illustrating a diaphragm driving sequence on the photographic lens 100 side. In FIG. 5B, similarly to FIG. 2B, a solid line A indicates opening and closing driving of the diaphragm blades. As illustrated in FIGS. 5A and 5B, as compared with FIGS. 2A and 2B, if the aperture reducing operation of the diaphragm 15 is started after waiting for completion of AE/AF, a waiting time occurs on the camera 200 side. Further, if the AE/AF operation is started after waiting for completion of the aperture opening operation of the diaphragm 15, a waiting time occurs on the camera 200 side. This may particularly reduce a speed of continuous shooting.

Now referring back to FIG. 1, the interchangeable photographic lens 100 includes the above-described lens MPU 1, lens position output unit 2, lens driving unit 3, diaphragm driving unit 4, table 5, and table 6. The interchangeable photographic lens 100 is connected to the camera 200 (main body) via the mount 16, as shown by broken lines in FIG. 1. Thus, the interchangeable photographic lens 100 is detachably mounted on the camera (main body) 200.

The camera 200 includes a light metering unit 7. The light metering unit 7 photo-electrically converts an object image received via a light metering optical system (not illustrated) into a change in electric potential. A detection unit 8 is configured to detect a defocus amount by photo-electrically converting an object image received via a secondary image-forming optical system (not illustrated) to execute electric charge accumulation. The detection unit 8 outputs stored electric charge as a change in electric potential. The camera MPU 9 can mutually communicate with the lens MPU 1 via signal lines of the mount 16. Further, the camera MPU 9 contains an analog-to-digital (A/D) conversion unit (not illustrated). Furthermore, the camera MPU 9 contains a timer (not illustrated). The timer can measure time and a time period.

The camera 200 further includes a dial unit 10 configured to define various settings (shutter speed, aperture value, photographing mode, etc.) of the camera 200 and an image pickup unit 11. An exposure unit 12 executes retraction and return of a main mirror 17 and a sub mirror 18 and shutter control of an image pickup plane under the control of the camera MPU 9. A switch SW1 is turned on by a first stroke operation (half press) on the release button. A switch SW2 is turned on by a second stroke operation (full press) on the release button.

In addition, the camera 200 includes an image sensor 19, a focusing screen 20, a pentagonal mirror 21, and a finder 22.

The camera MPU 9 executes a light metering calculation required for automatic exposure based on an output from the light metering unit 7. More specifically, an object image reflected from the main mirror 17 and formed on the focusing screen 20 is directed to the light metering unit 7 via the light metering optical system (not illustrated). The light metering unit 7 includes a photoelectric conversion element. The light metering unit 7 executes electric charge accumulation for a predetermined time period and outputs luminance of an object as a change in electric potential. The camera MPU 9 reads this signal as a numerical value by the A/D conversion unit. The camera MPU 9 performs a light metering calculation on the read numerical value. Thus, the camera MPU 9 determines exposure corresponding to a photographing mode, such as a shutter priority, an aperture priority, or the like.

The camera MPU 9 calculates a defocus amount, which is an amount of focus deviation required for automatic focus adjustment, based on an output from the detection unit 8, which is configured to detect the defocus amount. More specifically, the camera MPU 9 calculates the defocus amount based on an image deviation amount of two images formed from object light fluxes passing through two different areas interposing an optical axis of the photographic lens 100. The light fluxes of two images pass through the main mirror 17, which is a half mirror. Then, the light fluxes are reflected by the sub mirror 18, which is located behind the main mirror 17, and are directed to the detection unit 8 by a secondary image-forming optical system (not illustrated).

The detection unit 8, which is configured to detect a defocus amount, includes a linear photoelectric conversion element. The detection unit 8 outputs an object image formed on the photoelectric conversion element as a change in electric potential. Unlike the light metering unit 7, when the accumulation of electric charge required for focus detection is completed, the detection unit 8 automatically terminates electric charge accumulation. However, when brightness of an object is low, the detection unit 8 consumes time for electric charge accumulation. Thus, in order to maintain a speed of shooting during continuous shooting, after a predetermined time has passed, the detection unit 8 forcibly terminates electric charge accumulation and reads an image signal. The camera MPU 9 reads signals of such two images as a change in numerical value with the A/D conversion unit. The camera MPU 9 applies correlation calculation to the signals to calculate an image deviation amount of two images, thus determining the defocus amount.

Next, an operation of the single-lens reflex camera 200 having the above-described configuration will be described with reference to a flowchart illustrated in FIG. 3.

In the present embodiment, when the switch SW1 is turned on in step S101, the camera MPU 9 starts AF and AE operations. First, in step S102, the camera MPU 9 starts electric charge accumulation for a photoelectric conversion element included in the light metering unit 7. In step S103, the camera MPU 9 starts electric charge accumulation for a photoelectric conversion element (defocus amount detection operation) included in the detection unit 8, which is configured to detect a defocus amount. Then, in next step S104, the camera MPU 9 determines whether electric charge accumulation for light metering for a predetermined time is completed. If the electric charge accumulation is not completed (NO in step S104), the processing waits until the completion of the electric charge accumulation. If the electric charge accumulation is completed (YES in step S104), the processing proceeds to step S105. In step S105, the camera MPU 9 executes the above-described light metering calculation.

When the light metering calculation is completed in step S105, the processing proceeds to step S106. In step S106, the camera MPU 9 determines whether the switch SW2 is turned on. If the switch SW2 is turned on (YES in step S106), the processing proceeds to step S109. In step S109, the camera MPU 9 executes a series of photographing operations (details will be described later). Then, the processing proceeds to step S110. On the other hand, if the switch SW2 is not turned on (NO in step S106), the processing proceeds to step S107. In step S107, the camera MPU 9 determines whether electric charge accumulation for a photoelectric conversion element included in the detection unit 8, which is configured to detect a defocus amount, is completed. If the electric charge accumulation is not completed (NO in step S107), the processing waits until the completion of the electric charge accumulation. Thereafter, when the electric charge accumulation is completed (YES in step S107), the processing proceeds to step S108. In step S108, the camera MPU 9 executes the above-described calculation of a defocus amount. Then, the processing proceeds to step S110. In step S110, the camera MPU 9 controls the lens driving unit 3 to drive the lens 14, that is, to perform focus adjustment, based on the calculated defocus amount.

After the above-described driving of the lens 14 is completed, the processing proceeds to step S111. In step S111, the camera MPU 9 determines whether the switch SW1 is turned on. If the switch SW1 is turned on (YES in step S111), the processing returns to a start of light metering in step S102. Hereafter, the camera MPU 9 repeats the flow of AF and AE until the switch SW1 is turned off in step S112.

Next, a photographing operation to be executed in step S109 in FIG. 3 will be described with reference to a flowchart illustrated in FIG. 4.

The camera MPU 9 starts an operation in step S201. First, in step S202, the camera MPU 9 transmits an aperture value determined in step S105 from the camera 200 to the photographic lens 100. Then, the camera MPU 9 acquires, from the photographic lens 100, a predicted time period required for driving the diaphragm 15 corresponding to the aperture value (predicted diaphragm driving time). That is, the camera MPU 9 acquires four values of entrance time, actual aperture reducing time, actual aperture opening time, and retraction time (see FIG. 2B) from the photographic lens 100 (in detail, tables 5 and 6). Note that, as described above, the entrance time refers to a predicted time period for which the diaphragm 15 does not block an object light flux after starting an aperture reducing operation. Further, the retraction time refers to a predicted time period for which the diaphragm 15 does not block an object light flux after starting an aperture opening operation.

After the camera MPU 9 completes acquisition of the predicted diaphragm driving time, the processing proceeds to step S203. In step S203, the camera MPU 9 determines whether electric charge accumulation for the photoelectric conversion element included in the detection unit 8, which is configured to detect a defocus amount, is completed. If the electric charge accumulation is completed (YES in step S203), the processing proceeds to step S208. In step S208, the camera MPU 9 executes the above-described calculation of a defocus amount. Then, the processing proceeds to step S209. In step S209, the camera MPU 9 starts an aperture reducing operation from a full-aperture state, as a first aperture value, to provide an aperture value, as a second aperture value, determined in step S105 in FIG. 3. Then, the processing proceeds to step S210.

On the other hand, if the camera MPU 9 determines that the electric charge accumulation for the photoelectric conversion element included in the detection unit 8, which is configured to detect a defocus amount, is not completed (NO in step S203), the processing proceeds to step S204. Then, in step S204, the camera MPU 9 determines whether a time obtained by subtracting entrance time from electric charge accumulation time predetermined to detect a defocus amount in order to maintain a speed of continuous shooting is positive. If the time is positive (YES in step S204), a time for continuing the electric charge accumulation still remains. Thus, the processing returns step S203. Thereafter, the camera MPU 9 executes similar operations. If the time is negative or zero (NO in step S204), the processing proceeds to step S205. In step S205, the camera MPU 9 starts an aperture reducing operation. At this time, the camera MPU 9 executes the electric charge accumulation for the photoelectric conversion element for detecting a defocus amount in parallel with the entrance time of the diaphragm 15. That is, when the camera MPU 9 executes the aperture reducing operation from the first aperture value to the second aperture value of the diaphragm 15, the camera MPU 9 starts the aperture reducing operation without waiting for completion of the electric charge accumulation for detecting a defocus amount. As illustrated in FIG. 2B, even if the diaphragm 15 operates within the entrance time in the retraction area, the diaphragm 15 does not block an object light flux. Thus, the amount of light does not change. Accordingly, this allows the electric charge accumulation for detecting a defocus amount.

Figure 3:
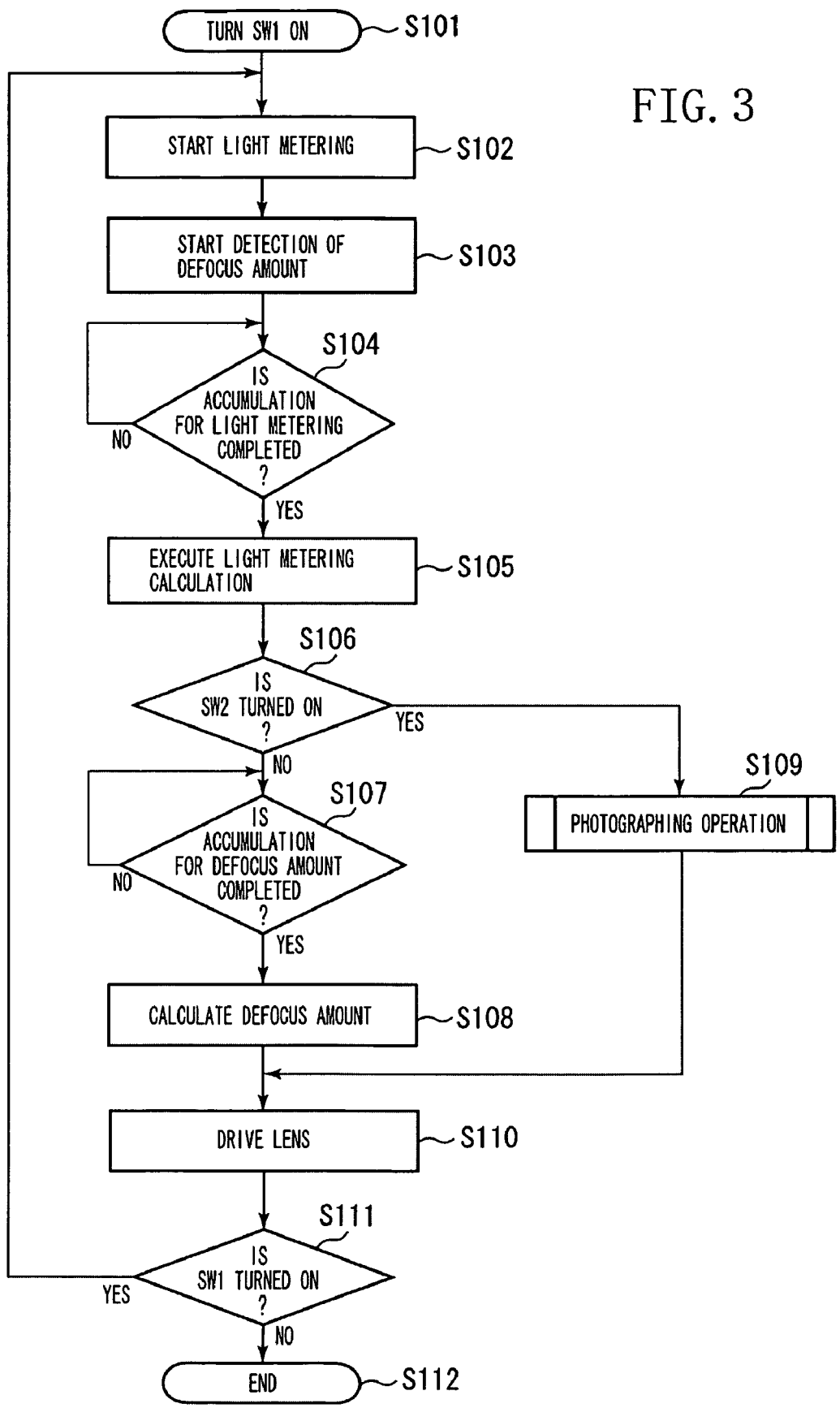
FIG. 3 is a flowchart illustrating an example operation of a camera according to an exemplary embodiment of the present invention.
Figure 4:
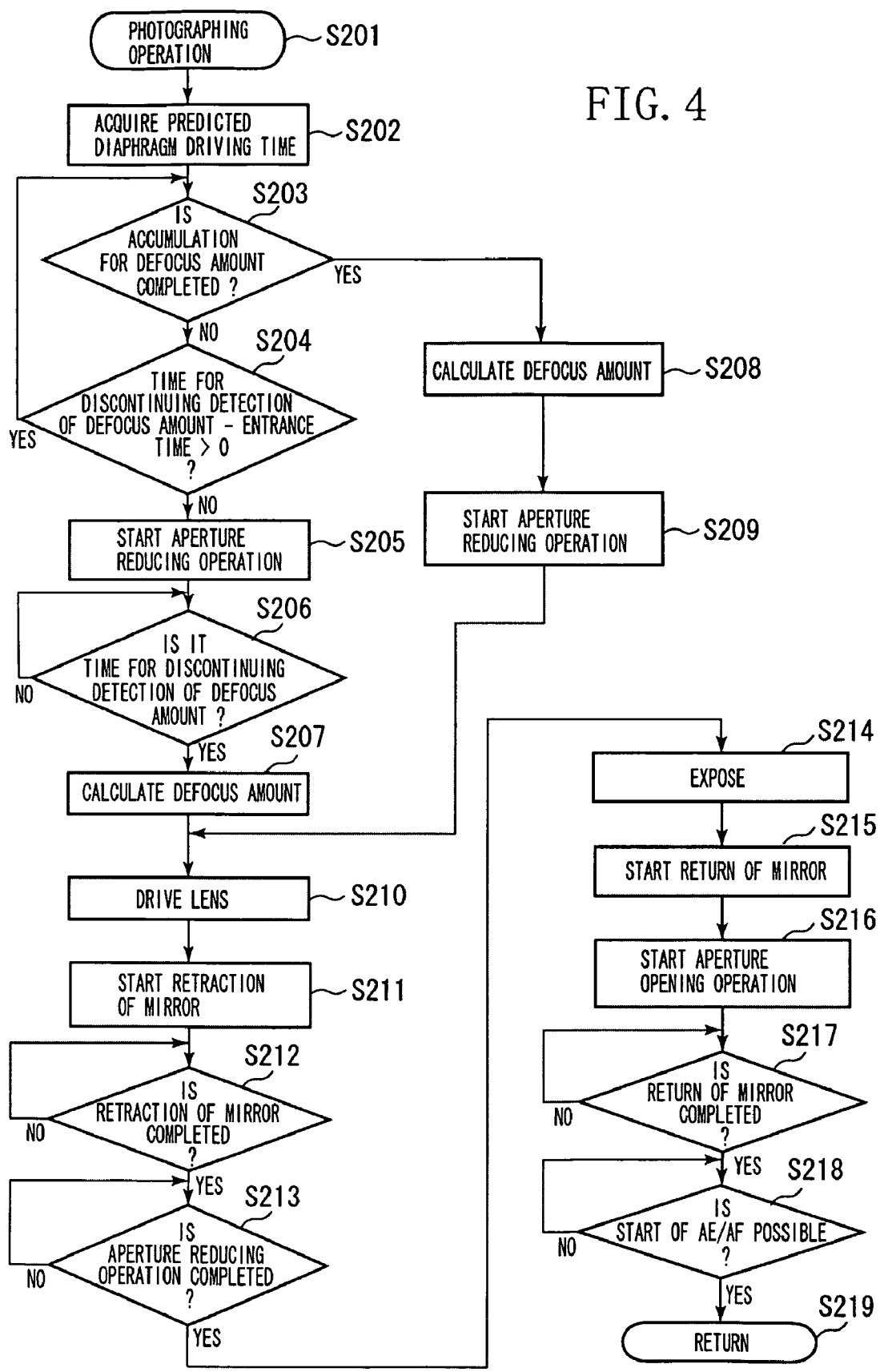
FIG. 4 is a flowchart illustrating a photographing operation to be executed in step S109 in FIG. 3.

Note that AE, among AE/AF illustrated in FIG. 2A, corresponds to the start of light metering in step S102, the electric charge accumulation for light metering in step S104, and the light metering calculation in step S105 in FIG. 3. Further, AF corresponds to the start of the detection operation of a defocus amount in step S103 in FIG. 3, that is, the start of the electric charge accumulation for detecting a defocus amount, the electric charge accumulation for detecting a defocus amount in step S203, the calculation of a defocus amount in step S207, and the calculation of a defocus amount in step S208 in FIG. 4.

After the camera MPU 9 starts the aperture reducing operation, the processing proceeds to step S206. In step S206, the camera MPU 9 determines whether the electric charge accumulation for detecting a defocus amount reaches time for discontinuation. If the electric charge accumulation for detecting a defocus amount does not reach the time for discontinuation (NO in step S206), the processing waits in this step until it reaches the time for discontinuation. Thereafter, if the camera MPU 9 determines that it reaches the time for discontinuation (YES in step S206), the processing proceeds to step S207. In step S207, the camera MPU 9 forcibly terminates the electric charge accumulation and executes calculation of a defocus amount.

After the camera MPU 9 starts the calculation of a defocus amount in step S207 or the aperture reducing operation in step S209, the processing proceeds to step S210. In step S210, the camera MPU 9 executes driving of the lens 14 based on the calculated defocus amount. Thereafter, the processing proceeds to step S211. In step S211, the camera MPU 9 starts retraction of the mirrors 17 and 18 from an object light path with the exposure unit 12. Then, in step S212, the camera MPU 9 determines whether the retraction of the mirrors 17 and 18 from the object light path is completed. If the camera MPU 9 determines that the retraction of the mirrors 17 and 18 is completed (YES in step S212), the processing proceeds to step S213. In step S213, the camera MPU 9 determines whether the aperture reducing operation is completed. If the aperture reducing operation is completed (YES in step S213), the processing proceeds to step S214. In step S214, the camera MPU 9 executes exposure of the image sensor 19 to record and store an object image.

Thereafter, the processing proceeds to step S215. In step S215, the camera MPU 9 starts return of the mirrors 17 and 18 with the exposure unit 12. Then, in step S216, the camera MPU 9 starts an aperture opening operation of the diaphragm 15 from a set aperture value to a full-aperture state. In step S217, the camera MPU 9 determines whether the return of the mirrors 17 and 18 is completed. If the return of the mirrors 17 and 18 is completed (YES in step S217), the processing proceeds to step S218. In step S218, the camera MPU 9 determines whether AE and AF can be started. More specifically, the camera MPU 9 determines whether a time period from the start of an aperture opening operation to an actual full-aperture position to fully open the diaphragm 15 has passed. That is, until the actual full-aperture position, the diaphragm 15 blocks at least a part of an object light flux. The camera MPU 9 determines whether a time period for which at least a part of an object light flux is blocked has passed. If the camera MPU 9 determines that the time has passed, that is, determines that AE and AF can be started (YES in step S218), the processing proceeds to step S219. Then, the processing returns to step S109 in FIG. 3. This allows the camera MPU 9 to detect a defocus amount in parallel with retraction time of the diaphragm 15 during continuous shooting. That is, during the aperture opening operation from an aperture value set as the second aperture value of the diaphragm 15 to a full-aperture state as the first aperture value thereof, the camera MPU 9 starts electric charge accumulation for detecting a defocus amount by the detection unit 8 without waiting for completion of the aperture opening operation.

Further, an operation performed in parallel with AE will be described below. If the processing returns from step S219 to the flow illustrated in FIG. 3 and the switch SW1 is continuously turned on in step S111, the camera MPU 9 executes light metering calculation for next shooting in steps S102, S104, and S105. The camera MPU 9 executes the light metering calculation in parallel with the retraction time of the diaphragm 15 as illustrated in FIGS. 2A and 2B.

In the above-described configuration, the photographic lens 100 outputs, to the camera 200, a predicted aperture reducing time (entrance time and actual aperture reducing time) and a predicted aperture opening time (actual aperture opening time from a predetermined aperture value to a full aperture value and retraction time) illustrated in FIG. 2B. Then, the entrance time is set as an AF operable time (defocus amount detectable time). The actual aperture reducing time is set as an AF inoperable time (defocus amount undetectable time). Further, the actual aperture opening time is set as an AE inoperable time (light metering calculation inoperable time) and an AF inoperable time. The retraction time is set as an AE operable time (light metering calculation operable time) and an AF operable time.

A single-lens reflex camera allowing higher-speed continuous shooting can be provided by outputting the AF and AE operable time (entrance time and retraction time) from the photographic lens 100 to the camera 200 and executing AF and AE in parallel with the diaphragm driving operation based on the AF and AE operable time.

In the present exemplary embodiment, the entrance time and the retraction time are set as an AF operable time. The actual aperture reducing time and the actual aperture opening time are set as an AF inoperable time. However, in the case of an AF system that needs only a light flux of a predetermined aperture value, for example, F5.6, irrespective of a full-aperture F value of a photographic lens, if the set aperture value is up to F5.6, all of the diaphragm driving time up to F5.6 can be set as an AF operable time irrespective of the aperture reducing state. Further, if the set aperture value is larger than F5.6, the diaphragm driving time until the aperture is reduced to F5.6 can be set an AF operable time, and the diaphragm driving time thereafter can be set as an AF inoperable time.

Similarly, if the aperture of the diaphragm 15 is opened from a state where the aperture is reduced up to F5.6, all of the diaphragm driving time up to F5.6 can be set as an AF operable time irrespective of the aperture opening state. Further, if the aperture of the diaphragm 15 is opened from a state where the aperture is reduced from a value larger than F5.6, the diaphragm driving time until the aperture of the diaphragm 15 is opened to F5.6 can be set as an AF inoperable time, and the diaphragm driving time thereafter can be set an AF operable time.

In the present exemplary embodiment, the tables 5 and 6 include premeasured fixed values. The table 5 stores a predicted time required to reduce an aperture of the diaphragm 15. The table 6 stores a predicted time required to open an aperture of the diaphragm 15. However, in the case of a camera system in which the diaphragm driving time is changed by temperature or aging, the lens MPU 1 can observe its change and correct the diaphragm driving time. More specifically, the lens MPU 1 can observe temperature to execute a correction or calculates a difference between the tables 5 and 6 and the actual diaphragm driving time, store the difference, and execute a correction of a predicted diaphragm driving time based on the difference. Alternatively, the camera MPU 9 can observe temperature, transmits the temperature to the lens MPU 1. Based on the temperature, the lens MPU 1 can correct the predicted aperture reducing time table 5 and the predicted aperture opening time table 6.

Further, the above-described exemplary embodiment exemplifies a single-lens reflex camera including a combination of the photographic lens 100 and the camera (main body) 200. However, the present invention can also be applied to a lens-integrated camera.

For example, the table 5, which stores a predicted time required to reduce the aperture of the diaphragm 15, and the table 6, which stores a predicted time required to open the aperture of the diaphragm 15, are provided not in the photographic lens 100 but in the camera 200. This enables reducing the amount of communication between the photographic lens 100 and the camera 200. However, such a case may limit the adaptable types of the photographic lens 100 and make the capacity of the tables 5 and 6 larger.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-038486 filed Feb. 19, 2007, which is hereby incorporated by reference herein in its entirety.

What is claimed is:

1. A camera adapted to receive a photographic lens having a diaphragm, the camera comprising:
a detection unit configured to execute electric charge accumulation for detecting a defocus amount when the diaphragm is in a state having a first aperture value; and
a controller configured to, when causing the diaphragm to perform an aperture opening operation from a second aperture value to the first aperture value, cause the detection unit to start the electric charge accumulation without waiting for completion of the aperture opening operation.

2. The camera according to claim 1, wherein the controller causes the detection unit to start the electric charge accumulation without waiting for completion of the aperture opening operation utilizing existence of an area in which the diaphragm does not block an object light flux when the diaphragm performs the aperture opening operation from the second aperture value to the first aperture value.

3. The camera according to claim 1, the controller acquires, from the photographic lens, time information on a predicted time period for which the diaphragm does not block an object light flux after the diaphragm starts the aperture opening operation, and, based on the time information, causes the detection unit to start the electric charge accumulation without waiting for completion of the aperture opening operation when the diaphragm performs the aperture opening operation from the second aperture value to the first aperture value.

4. A camera system comprising:
a camera; and
a photographic lens having a diaphragm, the lens being mountable to the camera;
wherein the camera includes,
a detection unit configured to execute electric charge accumulation for detecting a defocus amount when the diaphragm is in a state having a first aperture value; and
a controller configured to, when causing the diaphragm to perform an aperture opening operation from a second aperture value to the first aperture value, cause the detection unit to start the electric charge accumulation without waiting for completion of the aperture opening operation; and
wherein the photographic includes,
a diaphragm unit configured to adjust an amount of light of an object light flux to be directed to an image pickup unit of a camera on which the photographic lens is mounted; and
a diaphragm driving time prediction unit configured to output, to the camera, information on a predicted time period for which the diaphragm unit does not block the object light flux after the diaphragm unit starts an aperture reducing operation from a first aperture value to a second aperture value.

5. A camera system comprising:
a camera; and
a photographic lens having a diaphragm, the lens being mountable to the camera;
wherein the camera includes,
a detection unit configured to execute electric charge accumulation for detecting a defocus amount when the diaphragm is in a state having a first aperture value; and
a controller configured to, when causing the diaphragm to perform an aperture opening operation from a second aperture value to the first aperture value, cause the detection unit to start the electric charge accumulation without waiting for completion of the aperture opening operation; and
wherein the photographic includes,
a diaphragm unit configured to adjust an amount of light of an object light flux to be directed to an image pickup unit of a camera on which the photographic lens is mounted; and a diaphragm driving time prediction unit configured to output, to the camera, information on a predicted time period for which the diaphragm unit does not block the object light flux after the diaphragm unit starts an aperture opening operation from a second aperture value to a first aperture value.

* * * * *